United States Patent
Lin et al.

(10) Patent No.: US 6,738,980 B2
(45) Date of Patent: May 18, 2004

(54) METHODS AND SYSTEMS FOR VIDEO STREAMING WITH VCR FUNCTIONALITY

(75) Inventors: Chia-Wen Lin, Chiayi (TW); Ming-Ting Sun, Mercer Island, WA (US); Hung-Hseng Hsu, Hsinchu (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/987,647

(22) Filed: Nov. 15, 2001

(65) Prior Publication Data

US 2003/0093801 A1 May 15, 2003

(51) Int. Cl.$^7$ ............................................. H04N 7/173
(52) U.S. Cl. ............................ 725/88; 725/89; 725/90; 725/91; 725/92; 725/93; 725/102; 725/103
(58) Field of Search ............... 725/87, 88–100, 725/102, 103

(56) References Cited

U.S. PATENT DOCUMENTS

| | | | | |
|---|---|---|---|---|
| 5,521,630 A | * | 5/1996 | Chen et al. ................... 725/90 |
| 5,606,359 A | * | 2/1997 | Youden et al. ................ 725/88 |
| 5,689,298 A | | 11/1997 | Nishimura et al. |
| 5,720,037 A | | 2/1998 | Biliris et al. |
| 5,721,815 A | * | 2/1998 | Ottesen et al. .............. 345/721 |
| 5,739,862 A | | 4/1998 | Cen |
| 5,742,347 A | | 4/1998 | Kandlur et al. |
| 5,774,498 A | * | 6/1998 | Oya et al. .................... 375/257 |
| 5,815,146 A | * | 9/1998 | Youden et al. .............. 345/720 |
| 5,864,682 A | * | 1/1999 | Porter et al. ................. 370/468 |
| 5,922,048 A | * | 7/1999 | Emura ......................... 709/217 |
| 5,923,375 A | * | 7/1999 | Pau ......................... 375/240.01 |
| 5,928,327 A | | 7/1999 | Wang et al. |
| 6,014,706 A | | 1/2000 | Cannon et al. |
| 6,065,050 A | * | 5/2000 | DeMoney .................... 709/219 |
| 6,097,422 A | | 8/2000 | Aref et al. |
| 6,157,676 A | * | 12/2000 | Takaoka et al. ........ 375/240.13 |
| 6,229,951 B1 | * | 5/2001 | Schultz et al. ................ 386/68 |
| 6,367,079 B1 | * | 4/2002 | De Vos et al. .............. 725/112 |
| 6,385,771 B1 | * | 5/2002 | Gordon .................. 375/240.12 |
| 2003/0163824 A1 | * | 8/2003 | Gordon et al. ................ 725/90 |

OTHER PUBLICATIONS

M.S. Chen, D.D. Kandlur, "Downloading and Stream Conversion Supporting Interactive Playout of Videos in a Client Station," Second Int. IEEE Conf. Multimedia Computing and Systems, pp. 73–80, Washington, 1995.

(List continued on next page.)

Primary Examiner—John Miller
Assistant Examiner—Nathan A Sloan
(74) Attorney, Agent, or Firm—Finnegan, Henderson, Farabow, Garrett & Dunner, L.L.P.

(57) ABSTRACT

Methods and systems for providing a video stream from a server to a client over a network include a memory for storing a forward-encoded bit-stream and a reverse-encoded bit-stream for a video data. The forward-encoded bit-stream includes I-frames encoded without inter-frame dependencies and P-frames encoded depending on forward-direction preceding frames, and the reverse-encoded bit-stream includes I-frames and P-frames encoded depending on reverse-direction preceding frames. When the server receives a request with a video cassette recording (VCR) function from the client, the server reads out and transmits frames selectively from among the first, second, third, and fourth frames in accordance with the request. The server can select the closest I-frame to a requested frame in either bit-stream for a fast-mode play or a random-access play, and switch the bit-streams to use subsequent P-frames in a different direction than that of the closest I-frame.

4 Claims, 9 Drawing Sheets

OTHER PUBLICATIONS

T.D.C. Little and D. Venkatesh, "Prospects for Interactive Video–On–Demand," IEEE Multimedia, vol. 13, pp. 14–24, Aug. 1994.

D. Wu, Y. Hou, and Y. Q. Zhang, "Transporting Real–Time Video Over the Internet: Challenges and Approaches," Proceedings of IEEE, vol. 88, No. 12, pp. 1–19, Dec. 2000.

F.C. Li et al., "Browsing Digital Video," Technical Report: MSR–TR–99–67, Microsoft Research, Sep. 1999, ftp://ftp.research.microsoft.com/pub/tr/tr–99–67.pdf.

ISO/IEC 13818–2, "Generic Coding of Moving Pictures and Associated Audio," (MPEG–2), Nov. 1993.

ISO/IEC JTC1/SC29/WG11, "Coding of Moving Pictures and Associated Audio MPEG98/W2194," (MPEG–4), Mar. 1998.

ITU–T Recommendation H.261, "Video Codec for Audio-visual Services at p × 64 kbits/s," Mar. 1993.

ITU–T Recommendation H.263, "Video Coding for Low Bit–Rate Communication," May 1997.

S.J. Wee and B. Vasudev, "Compresssed–Domain Reverse Play of MPEG Video Streams," Proc. SPIE Conf. Multimedia Syst. and Appl., pp. 237–248, Nov. 1998.

N. Omoigui et al., "Time–Compression: System Concerns, Usage, and Benefits," Proc. ACM SIGHI Conf. pp. 136–143, May 1999.

S.J. Wee, "Reversing Motion Vector Fields," Proc. IEEE Int. Conf. Image Proc., Oct. 1998.

* cited by examiner

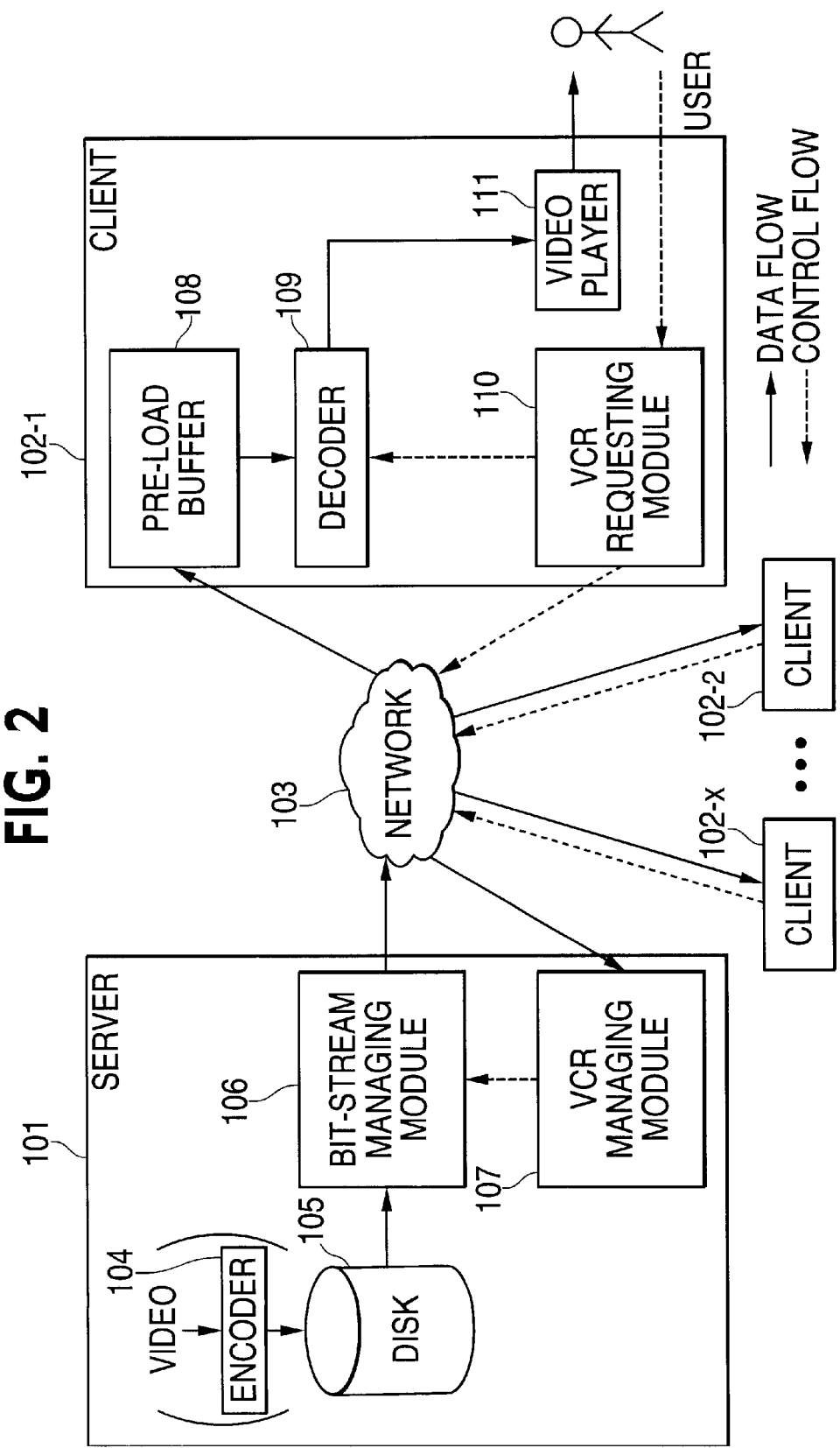

FIG. 6A

STARTING POINT

FRAME NO.  0 1 2 3 4 5 6 7 8 9 10 11 12 13 14 15 16 17 18 19 20 21 22 23 ...

F →  [I] P P P P P P P P P  P  P  P  [I] P  P  P  P  P  P  P  P ...

R ←   P P P P P P P [I] P P  P  P  P  P  P  P  P  P  P  P  [I] P  P ...

FAST-BACKWARD PLAY

P  I   I P I P P ...       FRAME TYPE
   20 14 7 8 0 1 2 ...       FRAME NUMBER
   *R  F  R F F F F* ...       SELECTED BIT-STREAM

FIG. 6B

STARTING POINT          ACCESS POINT

FRAME NO.  0 1 2 3 4 5 6 7 8 9 10 11 12 13 14 15 16 17 18 19 20 21 22 23 ...

F →  [I] P P P P P P P P P  P  P  P  [I] P  P  P  P  P  P  P  P ...

R ←   P P P P P P P [I] P P  P  P  P  P  P  P  P  P  P  P  [I] P  P ...

RANDOM-ACCESS PLAY

P I P  P  P ...       FRAME TYPE
   3 21 22 23 24 ...       FRAME NUMBER
   *F R F F F* ...       SELECTED BIT-STREAM

MOBILE & CALENDAR, CIF, QSCALE =16, GOP =14, ONLY I AND P PICTURES

MOBILE & CALENDAR, CIF, 3 Mbps, GOP =14, ONLY I AND P PICTURES

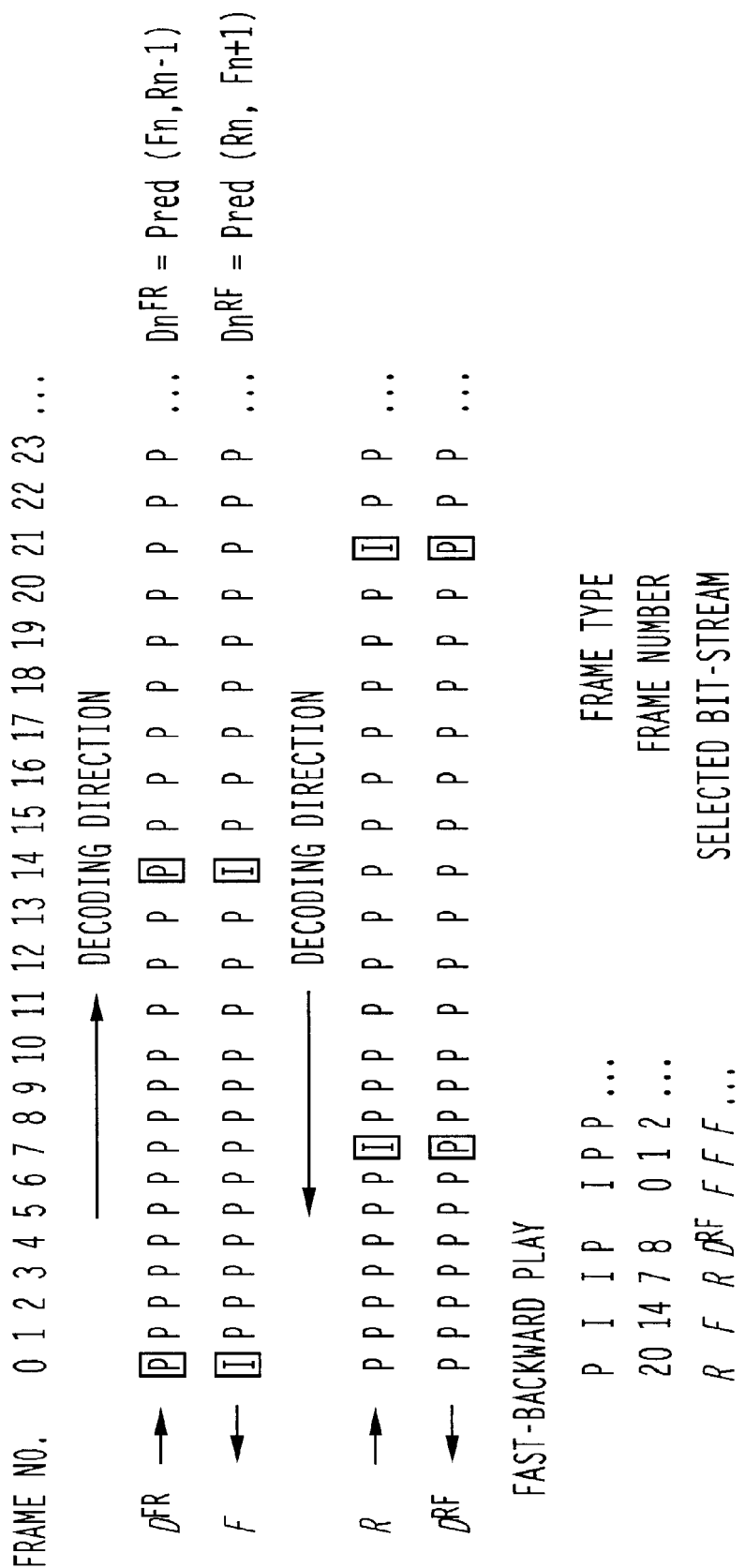

METHODS AND SYSTEMS FOR VIDEO STREAMING WITH VCR FUNCTIONALITY

BACKGROUND OF THE INVENTION

1. Field of the Invention

The present invention is generally related to video streaming and, more particularly, to methods and systems for implementing digital video cassette recording (VCR) functionality, such as random access, fast-forward, and fast-backward, on a video streaming system.

2. Description of the Related Art

Today's multimedia technologies allow network service providers to offer versatile services such as home shopping, games, video surveillance and movie on demand. In these applications, video streaming technology plays an important role in media delivery. A video streaming system should be capable of delivering concurrent video streams to a large number of users. The realization of such a system presents several challenges, such as the need for high storage-capacity and throughput in the video server and the high bandwidth in the network to deliver a large number of video streams. In addition, with the proliferation of online multimedia content, it is also highly desirable that multimedia streaming systems support effective and fast browsing.

A key technique that enables fast and user friendly browsing of multimedia content is to provide full VCR functionality. The set of effective VCR functions includes forward, backward, stop (and return to the beginning), pause, step-forward, step-backward, fast-forward, fast-backward, and random access. This set of VCR functions allows the users to have complete control over the session presentation and is also useful for other applications such as video editing.

With the establishment of video coding standards, it is expected that many video sequences for streaming applications will be encoded in MPEG (Moving Picture Experts Group) or H.26x (ITU-T Recommendation H.261 or H.263) formats. However, the implementation of full VCR functionality with the MPEG/H.26x coded video is not a trivial task. MPEG/H.26x video compression is based on motion compensated predictive coding with an I-P or I-B-P frame structure. Here, I, P, and B frames represent intra, predictive, and interpolated frames, respectively.

FIG. 1 shows a group-of-picture (GOP) structure of MPEG. The I-P or I-B-P-frame structures allow a straight-forward realization of the forward-play function, but impose several constraints on other trick modes such as random access, backward play, fast-forward play, and fast-backward play, for reasons discussed below.

With the I-B-P structure, to decode a P frame, the previously encoded I/P-frames first need to be decoded. To decode a B-frame, both the I/P-frames before and after this B-frame first need to be decoded. To implement the backward-play function, a straightforward implementation is for the decoder to decode the whole GOP, store all the decoded frames in a large buffer and play the decoded frames backward. However, this will require a huge buffer (e.g., an N-frame buffer, if the GOP size is N) in the client machine to store the decoded frames, which is not desirable. Another possibility is to decode the GOP up to the current frame to be displayed, and then go back to decode the GOP again up to the next frame to be displayed. This does not require the huge buffer but would require the client machine to operate at an extremely high speed (up to N times the normal decoding speed), which is also not desirable. The problem soon becomes impractical when the GOP size is large.

Besides the problem with backward-play, fast-forward/backward and random-access also present difficulties. When a P/B-frame is requested, all the related previous P/I-frames need to be sent over the network and decoded by the decoder. This requires the network to send all the related frames besides the actually requested frame at a much higher rate which can be many times that required by the normal forward-play. When many clients request trick-modes, it may result in much higher network traffic compared to the normal forward-play situation. It also requires high computational complexity in the client decoder to decode all these extra frames.

One way to solve the problem with fast-play may be to only send the I-frames for the trick-modes while encoding the video with the I-B-P or I-P structure. However, if the applications use a very large GOP-size, or require high-precision in video-frame access, sending I-frames only may not be acceptable. Also, this method does not resolve the problem for backward-play.

Another way to solve the problem with implementation of VCR functionality is encoding all the frames of the video as I-frames. This will result in the lowest complexity requirement for the client machines. However, it will require very large server storage and network bandwidth since the I-frames will result in high bit rates. Since the network bandwidth usually is the greatest concern, it would be preferable to encode the video with the I-B-P or I-P structure that can achieve high compression ratios for transport over a network with minimum bandwidth resources.

Therefore, methods and systems consistent with the present invention are directed to implementing VCR functions for MPEG/H.26x compressed video in video-on-demand (VOD) or streaming video applications, while minimizing extra network traffic and video decoder complexity, and retaining a desirable quality of decoded pictures.

SUMMARY OF THE INVENTION

Methods and systems consistent with the present invention provide an encoded video stream from a server to a client over a network.

The server has a memory for storing a forward-encoded bit-stream and a reverse-encoded bit-stream for video data. The forward-encoded bit-stream includes first frames encoded without inter-frame dependencies and second frames encoded depending on forward-direction preceding frames, and the reverse-encoded bit-stream includes third frames encoded without inter-frame dependencies and fourth frames encoded depending on reverse-direction preceding frames. The server reads out selected frames among the first, second, third, and fourth frames in accordance with a request with a video cassette recording (VCR) function from the client, and transmits the selected frames to the client.

The client that has transmitted the request to the server receives the frames selected from among the forward-encoded bit-stream and the reverse-encoded bit-stream, and then decodes the frames in an order as received, by predicting a next frame in one direction from a currently-decoded frame in another direction if switching between the forward-encoded and reverse-encoded bit-streams occurs in the frames received.

BRIEF DESCRIPTION OF THE DRAWINGS

The accompanying drawings provide a further understanding of the invention and are incorporated in and constitute a part of this specification. The drawings illustrate various embodiments of the invention and, together with the description, serve to explain the principles of the invention.

FIG. 2 shows an example of a video streaming system consistent with the present invention;

FIG. 6A illustrates an example of frame-selection with bit-stream switching for fast-backward play;

FIG. 6B illustrates an example of frame-selection with bit-stream switching for random-access play;

FIG. 9 illustrates an example of frame-selection with bit-stream switching in which the drift is compensated for fast-backward play.

DETAILED DESCRIPTION

Figure 1:
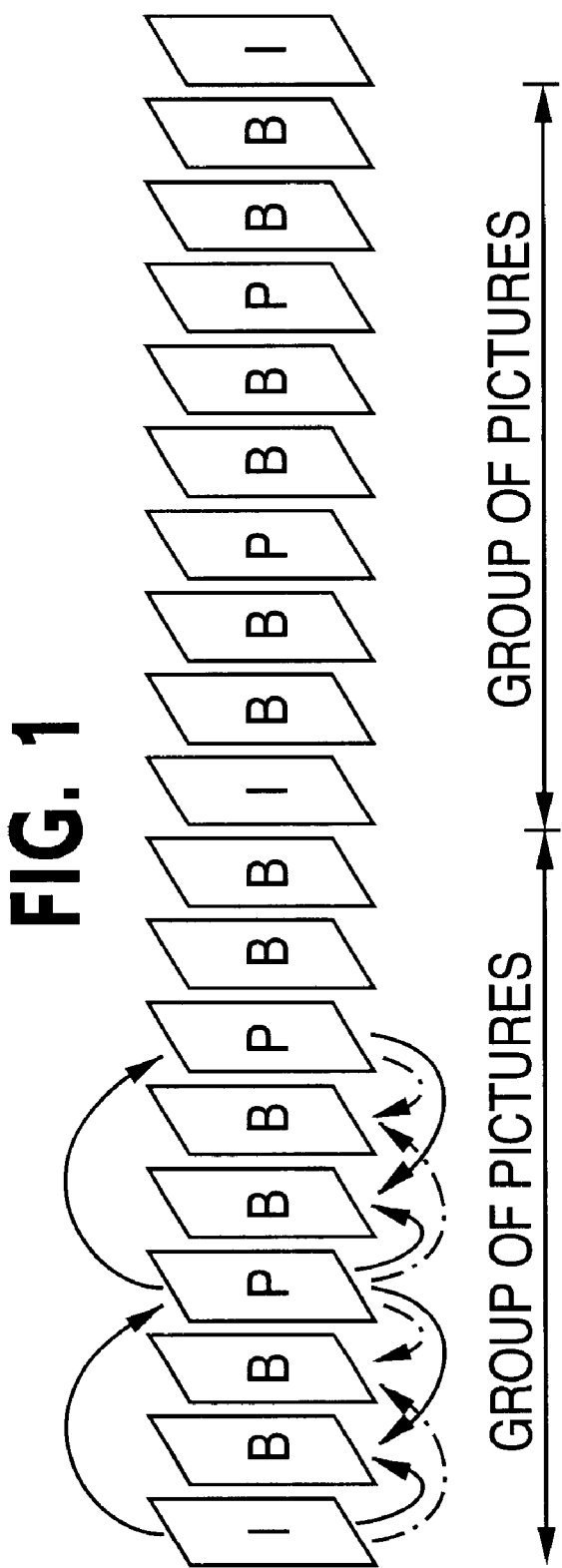
FIG. 1 illustrates a GOP structure of MPEG coded video.

The following detailed description refers to the accompanying drawings. Although the description includes exemplary implementations, other implementations are possible and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

System Configuration

FIG. 2 shows an exemplary configuration of the video streaming system in which methods and systems consistent with the present invention can be used. Video streams in the system are compressed using MPEG/H.26x video coding standards by an encoder 104 and are stored in a disk 105 of a video server 101. Encoder 104 may be within server 101 or outside server 101. Clients $102_{-1}$ to $102_{-X}$ can play video while the video is being streamed over a network 103. Network 103 can be the Internet. In each client machine 102, a pre-load buffer 108 is set up to smooth out the network delay jitter.

In methods and systems consistent with the present invention, the video has been encoded and stored in advance. Then, in response to a request from a user through a VCR requesting module 110 of client 102, a VCR managing module 107 of server 101 controls a bit-stream managing module 106 of server 101 to read a requested video stream in an encoded form out of disk 105. The request from the user may be associated with any one of the VCR functions. Bit-stream managing module 106 selectively reads out the encoded video stream in accordance with the requested VCR function, and then sends the video to client 102 over network 103.

Client 102 receives the encoded video in pre-load buffer 108, and then a decoder 109 decodes the received video stream in accordance with the requested VCR function. A video player 111 plays the decoded video for the user. The methods and systems consistent with the present invention allow use of a large GOP size, or realize relatively high precision in video-frame access.

General Description

In the following description, cases in which a bit-stream contains only I- and P-frames will be explained in detail. However, in light of the description, one of ordinary skill in the art will appreciate that methods and systems consistent with the present invention may also be extended to an I-B-P frame structure, since non-selected B-frames are not involved in decoding later frames and are not needed to be sent over the network or decoded by the decoder.

Figure 3A:
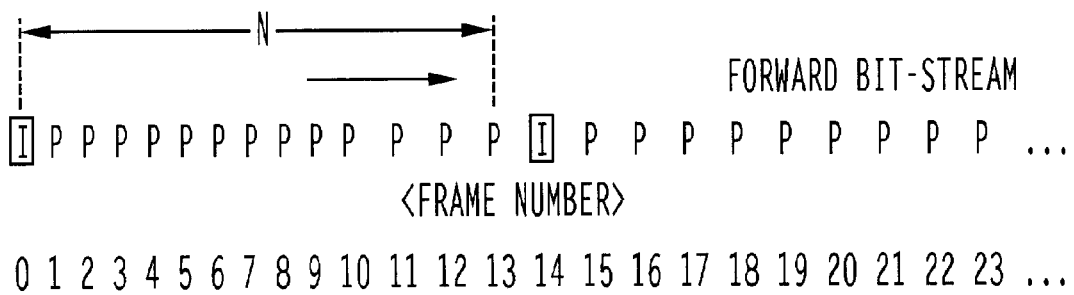
FIG. 3A shows an ordinary sequence of MPEG frames.
Figure 3B:
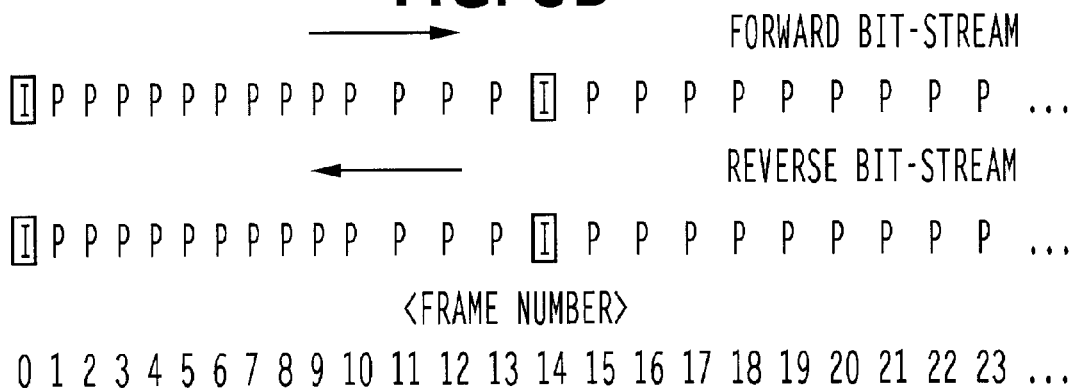
FIG. 3B shows an example of a dual bit-stream structure consistent with the present invention.
Figure 3C:
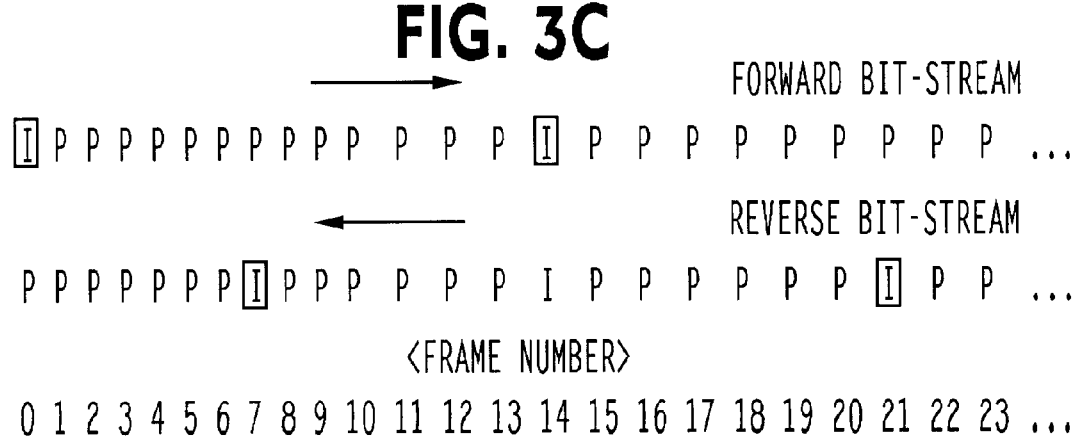
FIG. 3C shows another example of a dual bit-stream structure consistent with the present invention.

FIGS. 3A to 3C show an example of a frame sequence with a GOP size (N) of 14 frames. FIG. 3A shows an ordinary sequence of MPEG frames. When the decoder requests a frame with an arbitrary distance from the currently displayed frame, if the requested frame is an I-frame, the server side only needs to transmit the requested I-frame, and the decoder can decode it immediately. However, if the requested frame is a P-frame, the server needs to transmit all of the P frames from the most recent I-frame to the requested frame, in an ordinary sequence of MPEG I/P-frames as shown in FIG. 3A. For example, if the requested frame is frame 11, the server side transmits to the decoder I-frame 0 and succeeding P-frames 1 to 11. Thus, at maximum, the server transmits N frames so that the decoder can decode the requested frame, in the ordinary bit-stream structure as shown in FIG. 3A.

Methods and systems consistent with the present invention can reduce the number of frames to be transmitted. As shown in FIGS. 3B and 3C, in addition to an ordinary forward-encoded bit-stream, server 101 stores a reverse-encoded bit-stream for the same video in disk 105. To generate this reverse-encoded bit-stream, encoder 104 may encode the video frames in the reverse order after finishing the ordinary-direction encoding (i.e., reaching the last frame of the video sequence). If the server only has the forward bit-stream (i.e., the original video sequence is unavailable), server 101 may additionally have a decoder to decode the forward bit-stream up to two GOPs each time in the reverse direction (i.e., from the last GOP to the first GOP). Encoder 104 then re-encodes the video in the reverse order. The generation of the reverse bit-stream is done off-line.

In an exemplary sequence shown in FIG. 3B, the I-frames in both of the forward and reverse bit-streams are aligned. This arrangement can save storage space in disk 105 and pre-load buffer 108, since the two I-frames in the forward and reverse bit-streams are the same, and only one of them needs to be stored. If the requested frame is frame 11, the server selects the nearest I-frame 14 as well as the succeeding P-frames 13 to 11 in the reverse bit-stream, and then transmits these frames to the decoder. If the requested frame is frame 6, the server selects the nearest I-frame 1 and the succeeding P-frames 2–6 in the forward bit-stream. Therefore, the maximum number of frames that the server transmits to enable the decoder to decode the requested frame is reduced to N/2, according to the aligned dual bit-stream structure shown in FIG. 3B.

In another exemplary sequence shown in FIG. 3C, the I-frames in the reverse bit-stream are interleaved between the I-frames in the forward bit-stream. If the requested frame is frame 11, the server selects the nearest I-frame, which is frame 14 in the forward bit-stream, and P-frames 13 to 11 in the reverse bit-stream. Then, the decoder that receives these frames decodes P-frame 13 in the reverse bit-stream, based on I-frame 14 in the forward bit-stream, which is different than the bit-stream to which the P-frames belong. The decoder further decodes the received P-frames in the reverse bit-stream to obtain the requested frame 11. This frame-selection scheme with bit-stream switching is described below in detail.

Similarly, if the requested frame is frame 10, the server selects the nearest I-frame, frame 7 in the reverse bit-stream, and P-frames 8 to 10 in the forward bit-stream. The decoder that receives these frames decodes P-frame 8 in the forward bit-stream, based on I-frame 7 in the reverse bit-stream, which is different than the bit-stream to which the P-frames belong. Then, P-frames 9 and 10 are decoded.

If the requested frame is frame 6, the server selects the nearest I-frame 7 as well as the succeeding P-frame 6 in the reverse bit-stream. If the requested frame is frame 2, the server selects the nearest I-frame 0 as well as the succeeding P-frames 1 and 2 in the forward bit-stream. In the latter two cases, the decoder uses the I-frame and P-frames that belong to the same bit-stream.

By applying the above frame-selection scheme with bit-stream switching to the interleaved dual bit-stream structure as shown in FIG. 3C, the required number of frames sent by the server and decoded by the decoder can be further reduced to N/4. Due to this reduction of the number of frames, less buffer storage is required in the decoder.

The dual bit-streams can be arranged in either an aligned or interleaved way as explained above. Methods and systems consistent with the present invention can also be used in an intermediate or combined arrangement of these two ways.

In addition to the dual bit-stream, encoder 104 generates two metadata files to be stored in disk 105. Each of these files records the location of the frames in each compressed bit-stream. According to these files, bit-stream managing module 106 in server 101 can switch from the forward-encoded bit-stream to the reverse-encoded bit-stream and vice versa easily. I-frames represent the points of access to decode the sequence from any arbitrary position.

Using the above-described scheme, complexity of client machines and required network bandwidth for the VCR functions can be reduced, as will be explained in detail below. This scheme may double the storage requirement in the server, but the network bandwidth, which can be saved by this scheme, may be more precious than the server storage. Also, this scheme can accommodate a large number of various client machines in the streaming video applications.

Detailed Operations for each VCR Function

Figure 4:
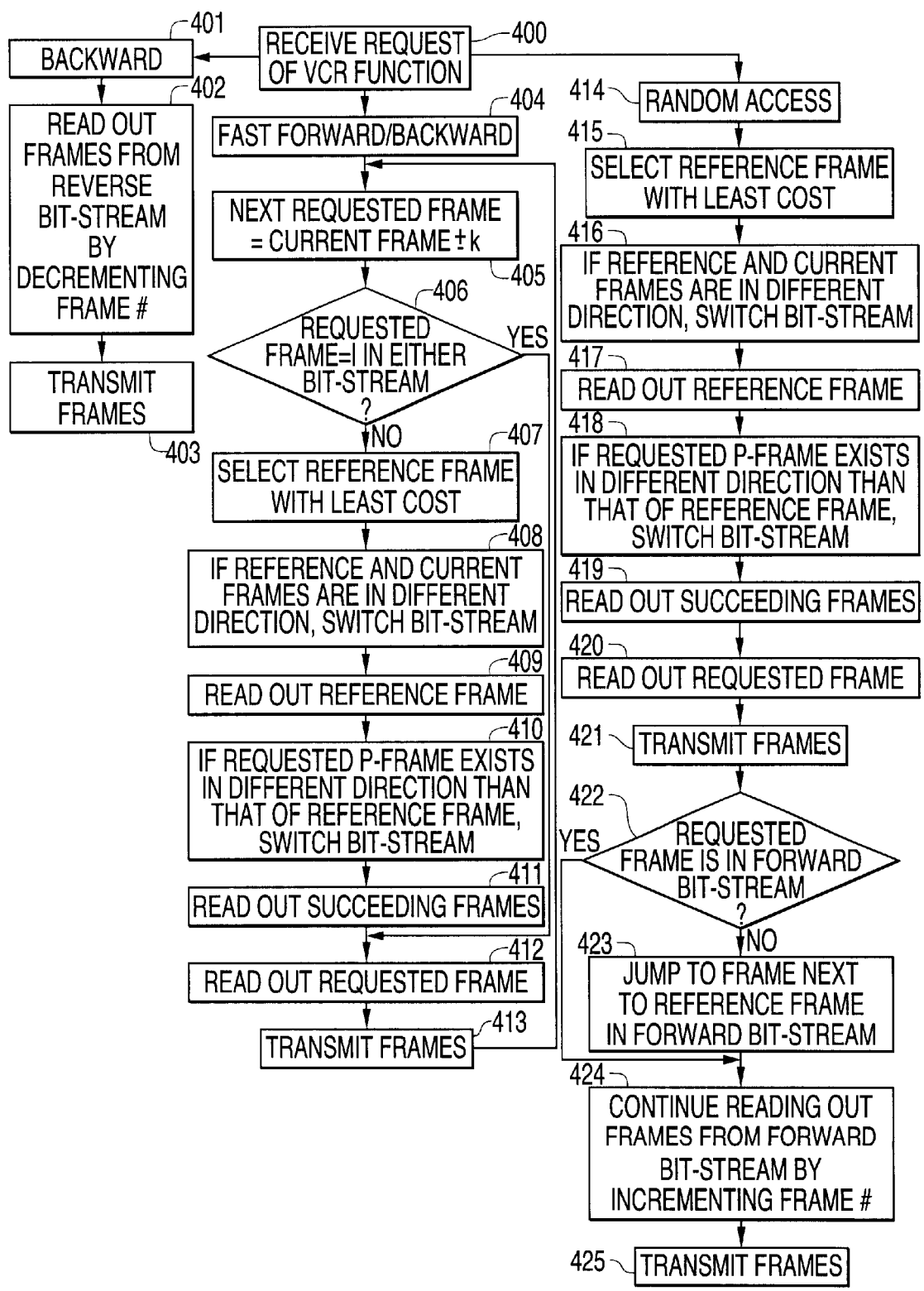
FIG. 4 is a flowchart showing exemplary operations of a server consistent with the present invention.
Figure 5:
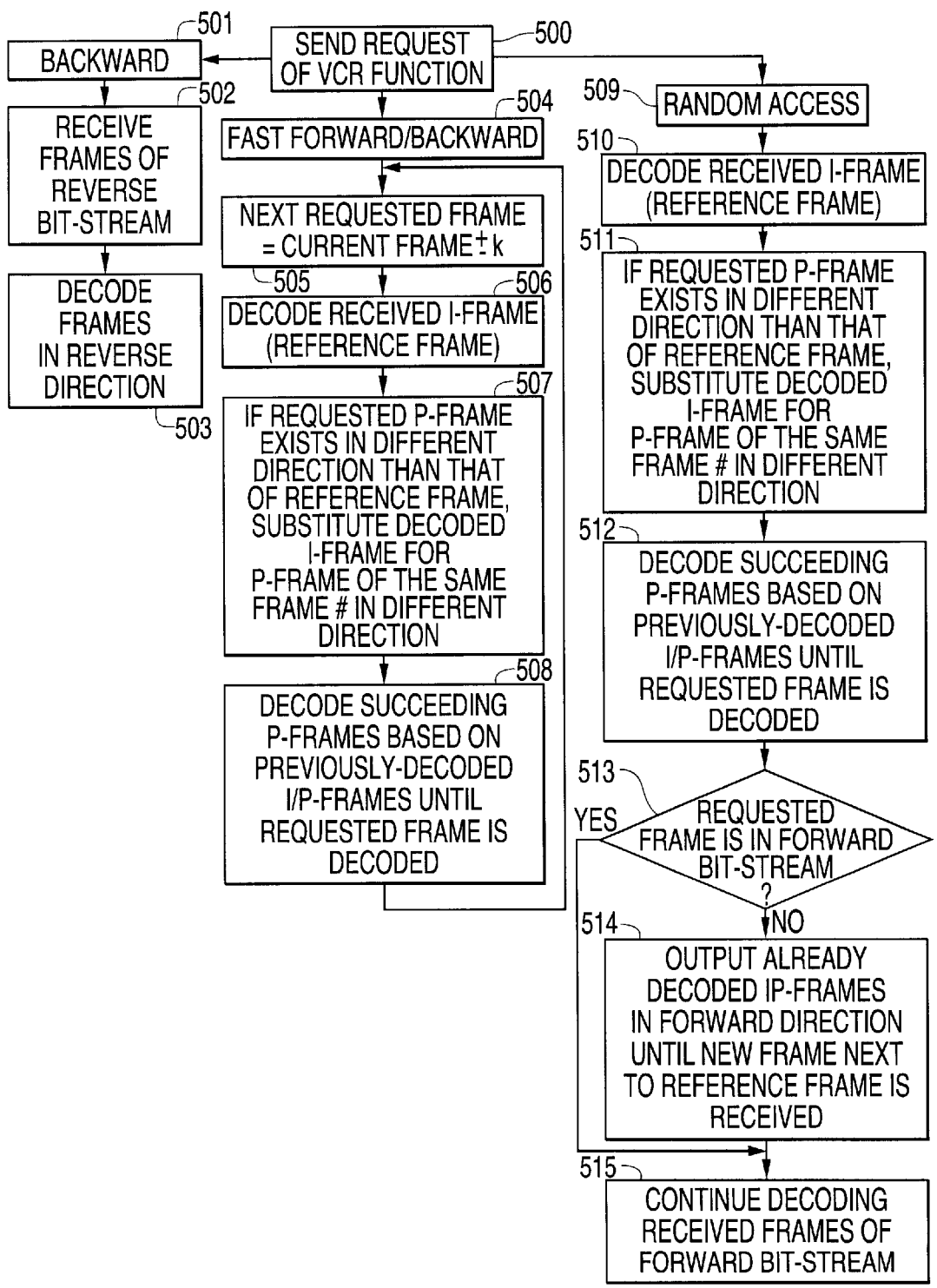
FIG. 5 is a flowchart showing exemplary operations of a client consistent with the present invention.

FIGS. 4 and 5 show exemplary operations for each VCR function of server 101 and client 102, respectively.

In methods and systems consistent with the present invention, the reverse-encoded bit-stream itself can reduce the complexity of client machines and the required network bandwidth for the backward-play function. When client 102 requests the backward-play mode through VCR requesting module 110 (step 401 of FIG. 4 and step 501 of FIG. 5), VCR managing module 107 of server 101 interprets the requested mode and controls bit-stream managing module 106. Bit-stream managing module 106 reads out the reverse-encoded bit-stream from the current frame toward the beginning frame (step 402 of FIG. 4), and transmits these bits to network 103 (step 403). Client 102 that has sent the backward-play request receives these bits (step 502 of FIG. 5), and decoder 109 decodes the reverse bit-stream in the order received (i.e., the decoding proceeds in the reverse direction from the current toward the beginning frame) (step 503).

To reduce the complexity of client machines and the required network bandwidth for the fast forward/backward play function, the frames to be transmitted and decoded are selected using bit-stream switching so as to minimize a predefined cost. The cost may be the decoding effort at the client decoder or the traffic over the networks, or a combination of both.

In the analysis below, $c_{R\_C}$ is the cost of decoding the next requested P-frame from the current displayed frame; $c_{R\_FI}$ is the cost of decoding the next requested P-frame from the closest I-frame in the forward bit-stream; and $c_{R\_RI}$ is the cost of decoding the next requested P-frame from the closest I-frame in the reverse-encoded bit-stream. Comparing the values of $c_{R\_C}$, $C_{R\_FI}$, and $c_{RRI}$, one frame is selected from among the current frame, the closest I-frame of the forward bit-stream, and the closest I-frame of the reverse bit-stream, as a reference frame that represents the least cost. The frames between the selected reference frame and the next requested frame are transmitted and decoded.

To minimize the number of frames sent to the decoder, the costs can be the distances from the possible reference frames to the next requested frame.

To minimize network traffic, the costs can be the numbers of bits required for decoding the next requested frame. The numbers of bits from the possible reference frames to the next requested frame are calculated by summing up the bit-rates of those frames to be transmitted. This calculation can be implemented by recording the number of bits used for each encoded frame in the metadata file in the earlier encoding process. In general, a larger number of frames to be sent implies a heavier network load. However, it also depends on the numbers of I-, P-, and B-frames to be sent since the numbers of bits produced by these three types of frames vary greatly.

It is also possible to use different weights to combine the above-described two kinds of costs: the number of frames to be transmitted and the number of bits of the frames. The weights can be determined based on the channel condition and the client capability.

Based on a current play-direction, a requested mode, and the costs $c_{R\_C}$, $C_{R\_FI}$, and $C_{R\_RI}$, the reference frame with the least cost relative to the next requested frame is selected to initiate the decoding. This selection also determines the next bit-stream and the decoding direction (i.e., forward or reverse). To avoid frequent bit-stream switching in the normal forward/backward operations, it may be preferable to activate this least-cost criterion only in the fast forward/backward and the random access modes.

When client 102 requests the fast-forward or fast-backward play (step 404 of FIG. 4 and step 504 of FIG. 5), VCR managing module 107 of server 101 controls bit-stream managing module 106 as follows. If a speed-up factor of the fast play is k (i.e., plays the video every k frames), a next requested frame is determined to be k frames after the current frame in the fast-forward mode, and k frames before the current frame in the fast-backward mode (step 405 of FIG. 4 and step 505 of FIG. 5).

If the requested frame is an I-frame (step 406 of FIG. 4, Yes), the I-frame is read out (step 412) and transmitted (step 413). If the requested frame is a P-frame (step 406, No), bit-stream managing module 106 selects the reference frame with the least cost by referring to the metadata files (step 407). If the reference frame belongs to the bit-stream different than that of the current frame, bit-stream managing module 106 switches the bit-streams (step 408) to read out the reference frame (step 409). Then, if the requested frame belongs to the bit-stream different than that of the reference frame, bit-stream managing module 106 again switches the bit-streams (step 410) to read out the succeeding P-frames in the selected bit-stream (step 411) until the requested frame is read out (step 412). In steps 408 and 410, if the frame to be read out next belongs to the same bit-stream that is currently read out, the bit-stream is not switched. Then, the bits of the reference, succeeding, and requested frames are transmitted (step 413), and a new next-requested frame is determined to continue the fast play process (step 405).

Client 102 that has sent the fast play request receives these bits, and decoder 109 first decodes the reference I-frame (step 506 of FIG. 5). Then, if the requested P-frame belongs to the bit-stream different than that of the reference frame, decoder 109 substitutes the decoded I-frame for a P-frame that has the same frame number in the other direction (step 507). Decoder 109 further decodes the received succeeding P-frames (step 508) using the I-frame decoded in step 507 or P-frames previously decoded in step 508, and finally decodes the requested frame.

FIG. 6A illustrates an example of the above-described scheme, in which the dual bit-streams shown in FIG. 3C are used, and the previous mode was backward-playing and the requested mode is fast-backward with a speed-up factor of 6 which needs to display a sequence of frame numbers 20, 14, 8, 2, . . . For simplicity of explanation in the following example, the distance from the possible reference frames to the next requested frame is used as the cost to be minimized. The algorithm in this example will operate as follows:

The current position is frame 20 which was decoded using the reverse bit-stream (R).

Frame 14 will be decoded from the forward bit-stream (F) directly since it is an I-frame.

Frame 8 will be decoded from frame 7 of the reverse bit-stream. I-frame 7 is chosen, because the distance between frame 7 of the reverse bit-stream and the requested frame (frame 8) is less than the other distances to the requested frame. The other distances considered are from the current decoded frame, i.e., frame 14 of the reverse bit-stream, and from the closest I-frame of the forward bit stream, which is also frame 14. In this case, decoder 109 uses frame 7 of the reverse bit-stream (an I-frame) as an approximation of frame 7 of the forward bit-stream (a P-frame) to predict frame 8 of the forward bit-stream. This will cause some drift. However, in the fast-forward/backward modes, human eyes are relatively insensitive to drift due to the fast change of the content displayed. Also, any I-frame in the play will terminate the drift. The drift can be compensated as will be described below.

Frame 2 will be decoded from frames 0 and 1, using the forward bit-stream, since the decoding effort from frame 0 of the forward bit-stream (an I-frame) is the minimum.

Following this algorithm, the bit-stream sent from the server will have the form shown in FIG. 6A. The frames indicated by the bold-face in FIGS. 6A and 6B are those to be displayed at the client side. In this example of fast-backward play, the frames that server 101 sends and client 102 decodes after frame 20 are six frames (frames 14, 7, 8, 0,1, and 2). If this fast-backward play were implemented in the ordinary sequence shown in FIG. 3 without the above-described scheme, 13 frames from the reverse bit-stream would need to be sent and decoded.

In the case of random access, frame skipping will be performed followed by normal forward-play. When client 102 requests random-access play (step 414 of FIG. 4 and step 509 of FIG. 5), VCR managing module 107 of server 101 controls bit-stream managing module 106 as follows. In a manner similar to the operations for the fast-play mode, if the requested frame is not an I-frame, bit-stream managing module 106 selects the reference frame with the least cost (step 415 of FIG. 4). Bit-stream managing module 106 switches the bit-streams if necessary (step 416) to read out the reference frame (step 417), and again switches the bit-streams if necessary (step 418) to read out the succeeding P-frames in the selected bit-stream (step 419) until the requested frame is read out (step 420). The frame skipping is completed when the bits of the reference, succeeding, and requested frames are transmitted (step 421).

To perform the normal forward-play from the random-accessed point, if the requested frame belongs to the forward bit-stream, i.e., the selected bit-stream in step 419 is the forward bit-stream (step 422, Yes), bit-stream managing module 106 continues reading out the succeeding frames from the forward bit-stream (step 424).

If the requested frame belongs to the reverse bit-stream, i.e., the selected bit-stream in step 419 is the reverse bit-stream (step 422, No), the frames between the requested frame and the nearest I-frame, which exist in the forward direction from the requested frame, were already read out in step 419. Therefore, bit-stream managing module 106 jumps to a frame next to the nearest I-frame in the forward direction (step 423), and reads out the succeeding frames from the forward bit-stream (step 424). The frames read out in step 424 are sequentially transmitted over network 103 (step 425).

Client 102 that has sent the random-access play request receives these bits and operates to decode the random-accessed frame in a similar manner to that of the fast-play mode. Decoder 109 first decodes the reference I-frame (step 510 of FIG. 5), and then decodes the received succeeding P-frames until the requested frame is decoded (step 512) by substituting the decoded I-frame for a P-frame that has the same frame number in the other direction, if necessary (step 511).

To perform the normal forward-play from the random-accessed point, if the requested frame belongs to the forward bit-stream (step 513, Yes), decoder 109 continues decoding the succeeding frames of the forward bit-stream as received (step 515).

If the requested frame belongs to the reverse bit-stream (step 513, No), the frames between the requested frame and the nearest I-frame, which exists in the forward direction from the requested frame, were already decoded in step 512. Therefore, decoder 109 outputs these already-decoded frames in the reverse order to that in which they were decoded, in order to output the frames in the forward direction (step 514). For example, the frames are decoded in the order of frames 21(I), 20(P), and 19(P) in steps 510 and 512, and outputted in the order of frames 19(P), 20(P), and 21(I) in step 514. Then, decoder 109 receives for decoding a new frame next to the nearest I-frame in the forward direction (e.g., frame 22), and continues decoding the succeeding frames of the forward bit-stream as received (step 515).

FIG. 6B illustrates an example of the above-described scheme, in which the dual bit-streams shown in FIG. 3C are used, and the client requests random access to frame 22 when the current decoded frame is frame 3. Frame 22 will be decoded from frame 21 of the reverse bit-stream, which is chosen since the distance to the requested frame (frame 22) is the least.

In this case, decoder 109 uses I-frame 21 of the reverse bit-stream as an approximation of P-frame 21 of the forward bit-stream to predict frame 22 of the forward bit-stream. This will cause drift, but the drift will only last a few frames within the GOP, i.e., a fraction of a second, since the video content will be refreshed by the I-frame in the next GOP. Also, the drift can be compensated as will be described below. Frames 23, 24, . . . of the forward bit-stream are transmitted and decoded for the normal forward-play after the frame skipping.

In the example of random-access play in FIG. 6B, the frames that server 101 sends and client 102 decodes are two frames; i.e., I-frame 21 and P-frame 22. If this random-access play were implemented in the ordinary sequence shown in FIG. 3 without the above-described scheme, 9 frames from I-frame 14 of the forward bit-stream would need to be sent and decoded.

Performance Analysis of the Conventional Method

Before analyzing the performance of exemplary methods and systems consistent with the present invention, the inventors analyzed the performance of the conventional straight-forward implementation of VCR functions. In the following analyses, that performance is represented by the average number of frames to be sent through the network and decoded at the client decoder to support random-access and fast-forward play.

Suppose all the GOPs in the bit-stream have the same length N, and frame $N_j$ is the random-access point. According to the conventional implementation on the bit-stream shown in FIG. 3A, in order to decode frame $N_j$, frames 0, 1, . . . $N_{j-1}$ should also be sent from the server side. Assuming the random-access points are uniformly distributed, the average number of frames to be transmitted is $$\overline{N}_{trans} = \frac{N+1}{2}.$$

For example, N=14, $\overline{N}_{trans}$=7.5, meaning that an average of 7.5 frames should be transmitted over the network and decoded by the decoder for the requested frame in the random-access mode.

Suppose frame $N_j$ is the starting point of the fast-forward operation, and k is the fast-forward speed up factor (e.g., for k=6, only one out of 6 frames will be displayed). Since the next frame to be displayed is $N_{j+k}$, the server may send the frames $N_{j+1}$ $N_{j+2}$ . . . $N_{j+k}$, so that k frames will be received by the client side to decode the frames $N_{j+1}$ $N_{j+2}$ . . . $N_{j+k}$ (but just display the frame $N_{j+k}$).

In fact, the server may not need to transmit every frame. For example, if frame 9 is the currently displayed frame, frame 15 is the next frame to be displayed under the fast-forward mode (k=6). Since frame 14 is an I-frame, there is no need to send frames 10–13, because they are not needed for the decoding of frame 15. Therefore, the server can just send frames 14 and 15.

It is useful to derive a closed-form formula to show the impact of the fast-forward play on decoding complexity and network traffic. One difficulty, similar to the random-access operation, is that the start point of the fast-forward mode can be any frame in a GOP. However, it is reasonable to assume that the start point of a fast-forward operation is an I-frame, since the system can always jump to the nearest I-frame first, without causing an unpleasant effect in viewing the video in most practical applications. Furthermore, after k/L GOPs, where L=gcd(k,N) which is the greatest common devisor of k and N, the frame to be displayed will again be an I-frame. Therefore, the decoding pattern will repeat every k/L GOPs, i.e., lcm(k,N) frames, where lcm(k,N) is the least common multiple of k and N. An analytical closed-form formula can be derived based on this periodicity. In each of the following three cases which have different combinations of N and k, the closed-form formula can be derived as follows.

Case 1: k>N, k mod N=0

In this case, all the P-frames are dropped, only the non-skipped I-frames are transmitted and decoded. No extra frames need to be transmitted for decoding the I-frames. Therefore, $\overline{N}_{trans}$=1.

Case 2: k>N, k mod N≠0

As explained above, the decoding pattern will repeat every k/L GOPs. During each period, there are N/L frames to be requested for display. For the i-th requested frame in each period (i=0 to N/L-1), a total of (i×k) mod N+1 (where "mod" stands for the modular operation) frames need to be transmitted and decoded. The average number of frames to be transmitted and decoded for displaying one frame is:

$$\overline{N}_{trans}(k, N) = \frac{L}{N} \sum_{i=0}^{\frac{N}{L}-1} ((i \times k) \bmod N + 1) \qquad (1)$$

$$= \frac{L}{N} \sum_{i=0}^{\frac{N}{L}-1} (i \times L + 1)$$

Case 3: 2≦k≦N−1, N mod k≠0

In a GOP with an I-P structure, a P-frame need not be sent only if all its following P-frames will not be displayed at the client decoder. Therefore, in the first GOP (assuming the start point is an I-frame), the number of frames that do not need to be transmitted is N mod k. Similarly, the number of P-frames that do not need to be sent in the j-th GOP, where 1≦j<k/L, is (j×N) mod k−1. Thus, the total number of frames that do not need to be transmitted in the k/L GOPs is:

$$N_{skip}(k, N) = \sum_{j=1}^{\frac{k}{L}-1} ((j \times N) \bmod k - 1) \qquad (2)$$

$$= \sum_{j=1}^{\frac{k}{L}-1} (j \times L - 1)$$

If N and k are coprime (i.e., L=1), the above equation becomes $$N_{skip}(k) = \sum_{j=1}^{k-1} (j-1) \qquad (3)$$

In the case that N and k are coprime, equation (3) holds for any start points (not necessarily an I-frame).

In case 3, the average number of frames that need to be transmitted and decoded for displaying a requested frame can be obtained by subtracting the non-transmitted frames from the total number of frames, and then dividing the result by the total number of frames to be displayed. That is:

$$\overline{N}_{trans}(k, N) = \frac{\frac{k}{L} \times N - N_{skip}(k, N)}{\frac{k}{L} \times \frac{N}{k}} \qquad (4)$$

-continued $$= k - \frac{L}{N} N_{skip}(k, N)$$

In summary, the average number of frames that need to be transmitted and decoded for a requested frame can be expressed in closed-form as follows:

$$\overline{N}_{trans}(k, N) = \begin{cases} 1 & k = 1 \text{ or } k \mod N = 0 \\ k - \frac{L}{N} \sum_{i=1}^{\frac{k}{L}-1} (i \times L - 1) & 2 \leq k \leq N - 1 \\ \frac{L}{N} \sum_{i=0}^{\frac{N}{L}-1} (i \times L + 1) & k > N, k \mod N \neq 0 \end{cases} \quad (5)$$

Equation (5) suggests that if N is relatively large compared to k, $\overline{N}$ will grow almost linearly as k increases, thereby leading to a linear increase of decoding complexity and network traffic.

The above analyses can be extended to a case with B-frames. The main difference from the above analyses is that, to decode a B-frame, only the related I/P-frames need to be decoded, i.e., the other B-frames do not need to be transmitted or decoded. Therefore, the number of frames that need to be transmitted and decoded for displaying the frame for GOPs with the general I-B-P structure is in general less than the I-P case. However, the analysis is similar to the one explained above. For simplicity of discussion, the case of k<N, which is divided into the following two cases, is described, assuming the start point is always an I-frame.

Case 1: k is a Multiple of M (where M is the Distance Between the I-P or P-P Frames)

In this case, all the B-frames need not be transmitted and decoded. Equation (5) can be applied by replacing k and N with k/M and N/M respectively.

Case 2: k is not a multiple of M

In this case, Equation (2) should be modified as follows:

$$N_{skip}(k, N) = \sum_{i=1}^{\frac{k}{L}-1} (i \times L - 1) + N_{B\_skip} - N_{P\_decodeB} \quad (6)$$

where $N_{B\_skip}$ represents the number of B-frames that do not need to be decoded, and $N_{P\_decodeB}$ represents the number of P-frames that need to be transmitted and decoded for decoding the B-frames in those GOPs in which the last displayed frame is a B-frame. It is difficult to find closed-form representations for the second and third terms on the right hand side of the above equation. Computer simulations can be used to determine the numbers $N_{B\_skip}$ and $N_{P\_decodeB}$ for different combinations of N, M, and k.

Performance Analysis of the Present Embodiment

Next, performance analyses of the scheme with dual bit-streams shown in FIG. 3C are described, using the minimum decoding distance criterion for the random-access and the fast-forward/backward modes.

In the interleaved dual bit-streams used for the analyses, both the forward bit-stream and the reverse bit-stream have the same GOP structure with the length of N. First, the random-access play is analyzed for the case in which frame $N_j$ is the random access point with $N_j$ in the range of [0,N−1], and $N_{RI}$ is the position of the I-frame in the reverse bit-stream with $N_{RI}$ in the range of [1,N−1].

In this case, the frames to be transmitted for decoding frame $N_j$ will be decided by two distance measures, one is the distance from frame $N_j$ to the nearest I-frame in the forward bit-stream, and the other distance measure is from $N_j$ to the nearest I-frame in the reverse bit-stream. In the example shown here, N is even and $N_{RI}$ is odd. Then, The minimum number of total frames to be sent over the network is 1 (when $N_j=0$ or $N_j=N_{RI}$);

The maximum number of total frames to be sent over the network is:

$$\max\left(\frac{N_{RI}-1}{2} + 1, \frac{N-1-N_{RI}}{2} + 2\right); \text{ and} \quad (7)$$

The average number of total frames to be sent over the network is:

$$\overline{N}_{trans} = 1 + \sum_{i=0}^{\frac{N_{RI}-1}{2}} \frac{i}{V} + \sum_{i=\frac{N_{RI}+1}{2}}^{N_{RI}} \frac{(N_{RI}-i)}{N} + \sum_{i=N_{RI}+1}^{\frac{N_{RI}-1+N}{2}} \frac{(i-N_{RI})}{N} + \quad (8)$$

$$\sum_{i=\frac{N_{RI}+1+N}{2}}^{N-1} \frac{(N-i)}{N}$$

$$= 1 + \frac{2N_{RI}^2 - 2NN_{RI} + N^2 - 2}{4N}$$

By taking the derivative of equation (8) with respect to $N_{RI}$, it is concluded that when $N_{RI}$ is the odd number closest to $$\frac{N}{2},$$

$\overline{N}_{trans}$ can take the minimum value of:

$$\overline{N}_{trans} = \begin{cases} 1 + \frac{N}{8} - \frac{1}{2N} & \left(\frac{N}{2} = \text{odd}\right) \\ 1 + \frac{N}{8} & \left(\frac{N}{2} = \text{even}\right) \end{cases} \quad (9)$$

For example, when N=14, $\overline{N}_{RI}=7$, $\overline{N}_{trans}=2.71$, meaning that an average of 2.71 total frames are transmitted to decode one requested frame in the random access mode. This shows an improvement achieved by the present embodiment, compared to the conventional method that requires an average of 7.5 total frames.

Next, fast-forward play is analyzed. In the proposed method with the interleaved dual bit-streams, when the speed-up factor k is larger than N/4, the server can always find an I-frame in one of the two bit-streams which has a shorter distance to the next displayed frame from the currently displayed P-frame, since the distance to the nearest I-frame is equal to or less than N/4. In this case, the number of frames to be sent for displaying a requested frame has a range of [1, N/4+1]. A closed-form formula to calculate the average number of frames transmitted and decoded for each requested frame is derived for the case in which the start point is an I-frame in the forward bit-stream and k>N/4.

Since the start point is an I-frame, the requested frames will again become I-frames every k/L GOPs, meaning that the decoding pattern will repeat every k/L GOPs. The distance between the i-th requested frame (i=0,1, . . . ) and its preceding I-frame is i×k mod N, which is a multiple of L. No distances will be the same in a period. Therefore, in a period of k/L GOPs, there are a total of N/L requested frames with equally-spaced distances, for example, 0, L, 2×L, . . . ,(N/L−1)×L frames away from their nearest preceding I-frames. Based on this property, in each of the following two cases, a closed-form formula can be derived as follows.

Case 1: N is even

In this case, every N/2 frames there is an I-frame (in either the forward or the backward bit-streams, when the I-frames are interleaved), which can be used as an anchor frame to initiate the decoding of the requested frames. The average number of frames transmitted for decoding a requested frame is:

$$\overline{N}_{trans} = 1 + \frac{1}{\frac{N}{L}} \left( \sum_{i=0}^{\lfloor \frac{N}{4L} \rfloor} i \times L + \sum_{i=\lfloor \frac{N}{4L} \rfloor+1}^{\lfloor \frac{N}{2L} \rfloor} \left(\frac{N}{2} - i \times L\right) + \right.$$
$$\left. \sum_{i=\lfloor \frac{N}{2L} \rfloor+1}^{\lfloor \frac{3N}{4L} \rfloor} \left(i \times L - \frac{N}{2}\right) + \sum_{i=\lfloor \frac{3N}{4L} \rfloor+1}^{\frac{N}{L}-1} (N - i \times L) \right)$$
$$= 1 + \frac{2L}{N} \left( \sum_{i=0}^{\lfloor \frac{N}{4L} \rfloor} i \times L + \sum_{i=\lfloor \frac{N}{4L} \rfloor+1}^{\lfloor \frac{N}{2L} \rfloor} \left(\frac{N}{2} - i \times L\right) \right) \quad (10)$$

where the number within the symbols $\lfloor \ \rfloor$, which is called the "floor" function, represents the largest integer smaller than the number, e.g., $\lfloor N/4L \rfloor$ is the largest integer smaller than N/4L. When N and k are coprime (i.e., L=1), $\overline{N}_{trans}$ is only a function of N regardless of the values of k. The above equation becomes:

$$\overline{N}_{trans} = 1 + \frac{2}{N} \left( \sum_{i=0}^{\lfloor \frac{N}{4} \rfloor} i + \sum_{i=\lfloor \frac{N}{4} \rfloor+1}^{\frac{N}{2}} \left(\frac{N}{2} - i\right) \right) \quad (11)$$
$$= \begin{cases} 1 + \frac{N}{8} & \text{if } \frac{N}{2} \text{ is even} \\ 1 + \frac{N}{8} - \frac{1}{2N} & \text{if } \frac{N}{2} \text{ is odd} \end{cases}$$

In fact, for the cases that N and k are not coprime, the results of equation (10) and (11) are still very close. Therefore, the simple formula in equation (11) can be applied in most of the cases that N is even.

Case 2: N is odd

Similar to the above derivation, the following formula is obtained:

$$\overline{N}_{trans} = 1 + \frac{1}{\frac{N}{L}} \left( \sum_{i=0}^{\lfloor \frac{N-1}{4L} \rfloor} i \times L + \sum_{i=\lfloor \frac{N-1}{4L} \rfloor+1}^{\lfloor \frac{N-1}{2L} \rfloor} \left(\frac{N-1}{2} - i \times L\right) + \right.$$
$$\left. \sum_{i=\lfloor \frac{N-1}{2L} \rfloor+1}^{\lfloor \frac{3(N-1)}{4L} \rfloor} \left(i \times L - \frac{N-1}{2}\right) + \sum_{i=\lfloor \frac{3(N-1)}{4L} \rfloor+1}^{\frac{N}{L}-1} (N - i \times L) \right) \quad (12)$$

When N and k are coprime, equation (12) becomes:

$$\overline{N}_{trans} = 1 + \frac{N}{8} - \frac{1}{8N} \quad (13)$$

Figure 7A:
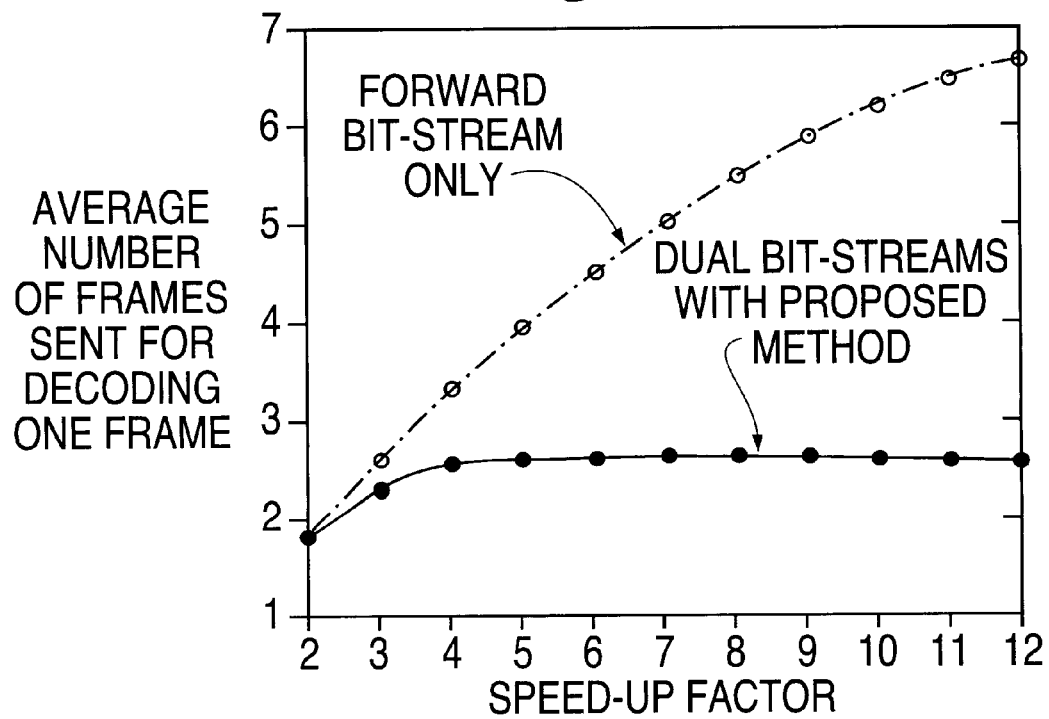
FIG. 7A shows an exemplary improvement by the present embodiment in complexity of client machines.
Figure 7B:
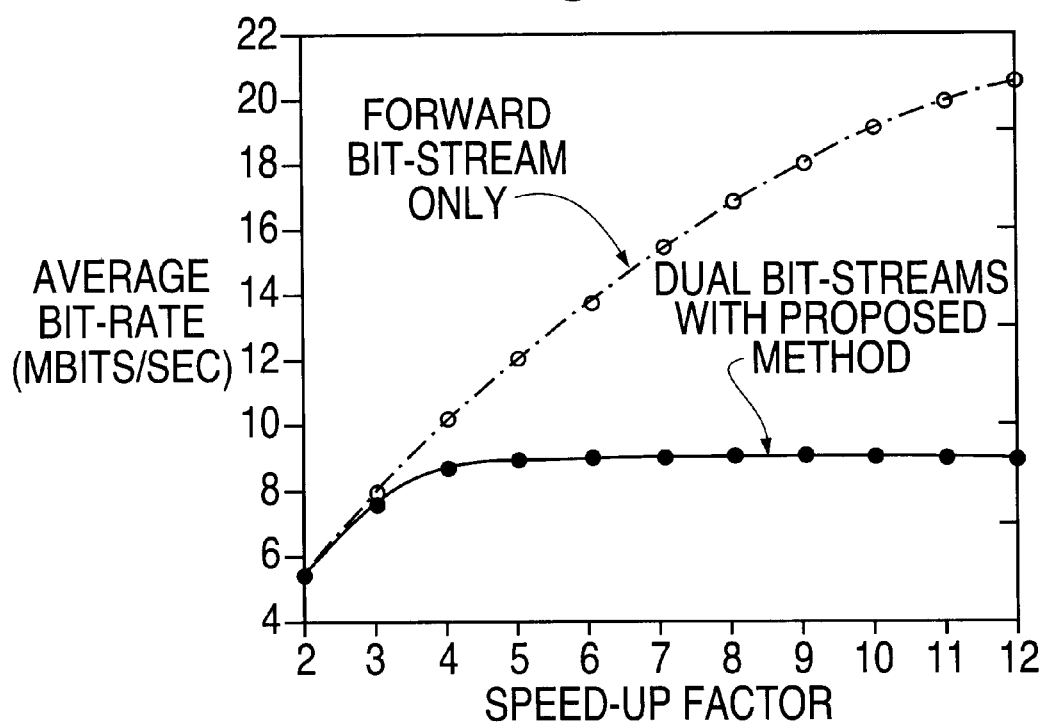
FIG. 7B shows an exemplary improvement by the present embodiment in requirement of network bandwidth.

The inventors also performed a simulation for the case of the I-P structure for N=14 with a number of randomly generated start points. The test MPEG bit-stream used for the simulation was the "Mobile and Calendar" sequence, which is a particular video sequence widely used in the MPEG committee for evaluating performance of various coding methods. The "Mobile and Calendar" sequence with a length of 280 frames, which consists of 20 GOPs in this example, and which had been encoded at 3 Mbps with a frame-rate of 30 fps with an I-P structure, was used for this simulation. FIGS. 7A and 7B shows the simulation results including the comparison between the interleaved dual bit-stream and least-cost method (solid-line) embodiment of the present invention and the conventional method with only one forward bit-stream (broken-line).

FIG. 7A depicts the improvement in the average number of frames transmitted to the decoder for decoding a requested frame with respect to different speed-up factors in the fast-forward operation. This shows that the present embodiment reduced the decoder complexity. The simulation result is very close to the value of 2.71 frames calculated by using equation (11) with N=14 when the speed-up factor k>N/4. The fast-backward play case should also have a similar result.

FIG. 7B depicts the simulated improvement in the average bit-rates required to read the video stream with respect to different speed-up factors in the fast-forward operation. In the conventional method, the server needs to send extra frames to the decoder to display one frame, thereby resulting in a heavy burden on the network, especially when the number of users is large. However, as the simulation results show, the present embodiment reduced the extra network traffic.

In accordance with the present embodiment, when the speed-up factor reaches approximately N/4, e.g., 3.5 in this example, the decoding complexity and the network traffic do not continue to grow even when the speed-up factor further increases. This represents a performance improvement achieved by the method of the present embodiment, compared to the results for the conventional method. When the speed-up factor is k≧N/4, the proposed method provides a nearly constant cost for both decoding complexity and network traffic.

Drift Compensation

Figure 8A:
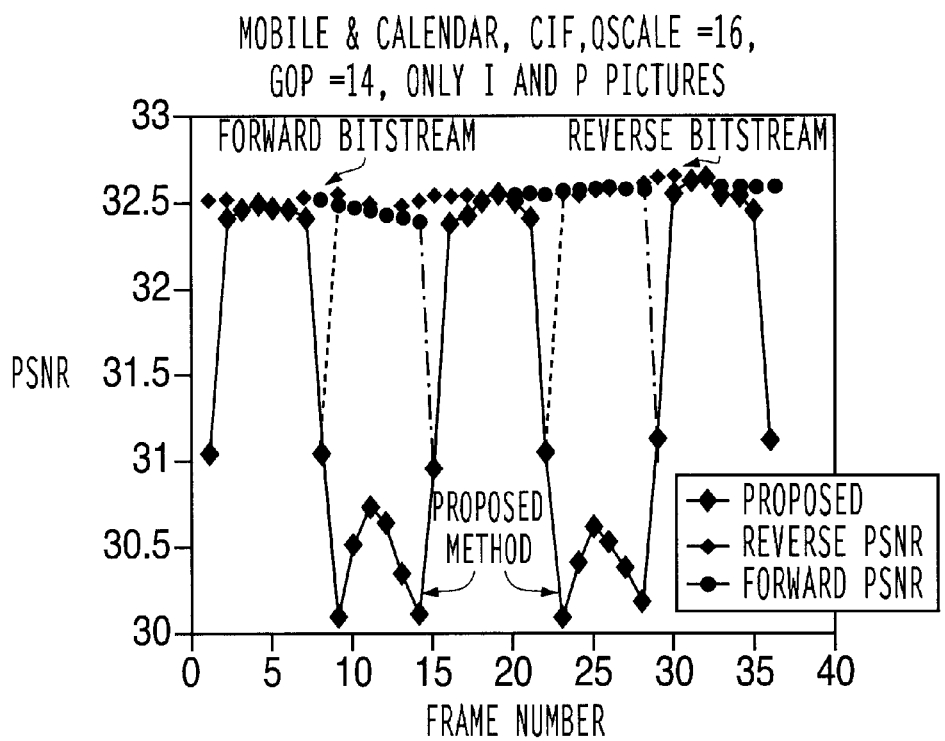
FIGS. 8A and 8B show an exemplary peak-signal-to-noise-ratio (PSNR) of each frame that suggests drift caused by bit-stream switching.
Figure 8B:
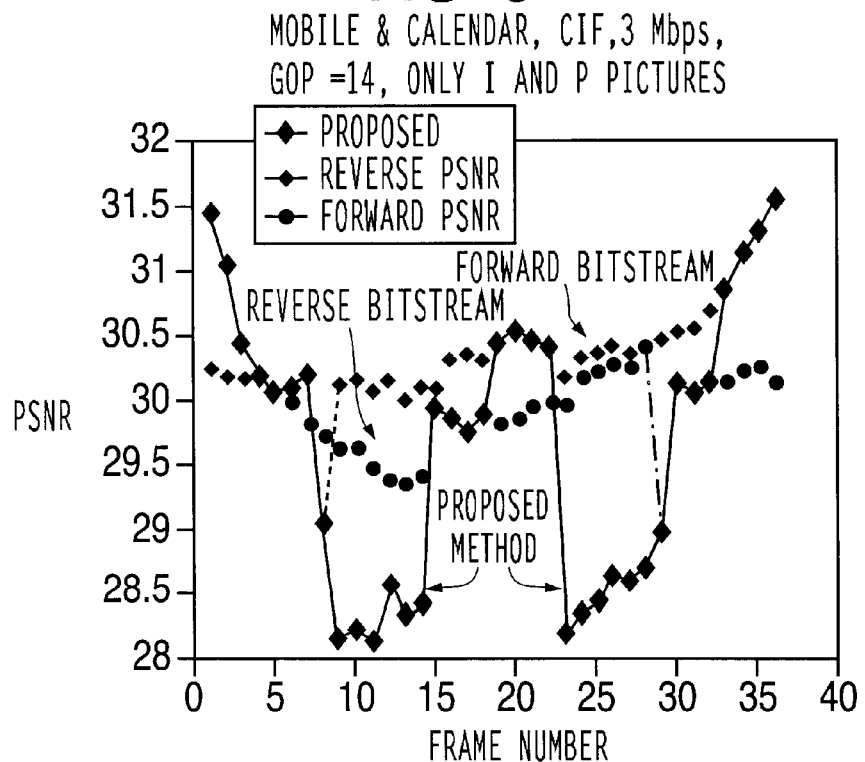

As described above, in accordance with the present embodiment, I- or P-frames of one bit-stream may be used to approximate P-frames of the other bit-stream. This approximation, however, may lead to frame mismatch and thus cause drift when the approximated frames are used as the reference frames to predict the following P/B-frames. FIGS. 8A and 8B depict simulation results that show the possible drift. In this simulation, the "Mobile & Calendar" sequence was encoded at a fixed quantization scale (Q=16) in the example of FIG. 8A, and at a fixed bit-rate (3 Mbps) in the example of FIG. 8B. The GOP size was 14 and the speed-up factor was 6.

As shown in FIGS. 8A and 8B, when the server performs an I-to-P or a P-to-P approximation by using the proposed bit-stream switching, there is a PSNR drop. For example, FIG. 8A suggests that the drift caused by the bit-stream switching can be as large as 2.5 dB and will last until the next I-frame. However, the subjective degradation observed is not significant, since the fast display speed in the fast forward/backward modes will mask most of the spatial distortions.

In the random access mode, the drift will only last a few frames within a GOP, and thus will not cause serious degradation. In the fast forward/backward mode, human eyes are relatively insensitive to the drift due to the fast changes of the content displayed. However, in some applications, it may still be desirable to prevent the drift. The drift problem can be resolved by, for example, adding two bit-streams consisting of all P-frames for drift-compensated bit-stream switching.

More specifically, as shown in FIG. 9, two bit-streams $D^{FR}$ and $D^{RF}$ are produced and stored in the earlier encoding stage in addition to the dual bit-streams of FIG. 3C. $D^{FR}$ is a bit-stream used for switching from the I- or P-frames of the forward bit-stream to the P-frames of the reverse bit-stream, and $D^{RF}$ is used for switching from the I- or P-frames of the reverse bit-stream to the P-frames of the forward bit-stream. The bit-streams $D^{FR}$ and $D^{RF}$ are generated as follows:

$$D_n^{FR} = \text{Pred}(F_n, R_{n-1}) \tag{14}$$

and $$D_n^{RF} = \text{Pred}(R_n, F_{n+1}) \tag{15}$$

where Pred(A,B) represents an inter-frame prediction process that frame B is predicted from the reference frame A.

When performing the bit-stream switching in steps 410 and 418 of FIG. 4, the correctly predicted frame is used for switching between the forward and the reverse bit-streams. For example, if the bit-stream is switched from $F_n$ (an I- or P-frame) to $R_{n-1}$ (a P-frame), the server sends the frames as ... $F_n, D_n^{FR}, R_{n-2}$ ..., instead of sending ... $F_n, R_{n-1}, R_{n-2}, \ldots$. If the bit-stream is switched from $R_n$ (an I- or P-frame) to $F_{n+1}$ (a P-frame) the server sends the frames as ... $R_n, D_{n+1}^{RF}, F_{n+2}, \ldots$, instead of sending ... $R_n, F_{n+1}, F_{n+2}, \ldots$.

With the two drift-correction bit-streams, the method of the present embodiment generates a bit-stream as shown in FIG. 9 for the fast-backward example of FIG. 6A. Since $D^{RF}$ is encoded based on decoded frames from the forward and the reverse bit-streams, the drift can be well compensated. If the prediction errors of the drift-compensated predictive frames in $D^{RF}$ and $D^{FR}$ are encoded with no loss, there may be no drift. Otherwise, there may be small drift. The drift may depend on the quantization step size used in the encoding. A finer quantizer will lead to lower drift, while increasing the storage requirement for the drift compensation bit-streams. Since the encoding process to produce all the bit-streams is done off-line in streaming video applications, the encoding complexity to produce the drift compensation bit-streams is not relevant.

If the I-frames of the dual bit-streams are interleaved and the speed-up factor is high enough (e.g., the frame skipping distance $\geq$N/4) in the proposed method, there always exists an I-frame in one of the two bit-streams that has a shorter distance to the next requested frame than the current decoded P-frame. Therefore, only replacing I-frames of the forward or reverse bit-stream with P-frames of the bit-stream $D^{FR}$ or $D^{RF}$ may be sufficient. In this case, the bit-streams $D^{FR}$ and $D^{RF}$ may contain only the drift compensation frames for all the I-frames (but no P-frames) of both the forward and reverse bit-streams. That is, in the example of FIG. 9, $D^{FR}$ is produced only for frames 0, 14, 28, ..., and $D^{RF}$ is produced only for frames 8, 22, 36, ..., instead of every frame, and thus the storage cost for the drift compensation frames can be greatly reduced.

On the other hand, in the fast-forward/backward operations with small speed-up factors (e.g., 2 or 3), the proposed least-cost scheme has limited gain on the decoding complexity and the network traffic as shown in FIGS. 7A and 7B. Thus, if the frame skipping distance is less than N/4, an alternative scheme for reducing the drift is to give up the bit-stream switching that causes the drift. In this case, the server has the dual bit-streams (but no drift-compensation frames), and selects the nearest I-frame without the bit-stream switching from the selected I-frame to the requested P-frame. That is, in the example of FIG. 3C, if the requested frame is frame 11, the server examines the distances from I-frame 0 of the forward bit-stream and from I-frame 21 of the reverse bit-stream, since frame 11 exists in the forward direction from frame 0 and in the reverse direction from frame 21. Then, frame 21 with less cost is chosen, instead of frame 14 with the bit-stream switching.

Therefore, a possible implementation with lower-complexity and without drift for the fast-forward/reverse play may be:

If k<N/4

Use dual bit-streams without performing bit-stream switching, else

Use bit-stream switching with I->P drift-compensation only.

Persons of ordinary skill will realize that many modifications and variations of the above embodiments may be made without departing from the novel and advantageous features of the present invention. For example, the dual bit-streams shown in FIGS. 3B and 3C can be extended to the I-B-P frame structure. In that case, the forward bit-stream includes B-frames encoded depending on forward-direction preceding and succeeding I/P frames, and the reverse-encoded bit-stream includes B-frames encoded depending on reverse-direction preceding and succeeding I/P frames. Thus, for example, with reference to FIG. 4, in the backward-play mode, the B-frames in the reverse bit-stream are also read out toward the beginning of the video (step 402), and transmitted to the decoder (step 403). In the random-access mode, the B-frames following the requested frame in the forward bit-stream are read out (steps 423 and 424), and transmitted to the decoder (step 425). In the fast-play mode, if the requested frame is a P-frame, the process will be the same. If the requested frame is a B-frame, after bit-stream switching, if necessary, the succeeding P-frames are read out until reaching the P-frame required to decode the requested B-frame (steps 411 and 419). The requested B-frame in the forward or reverse direction is decoded based on the preceding and succeeding I/P frames in the same direction.

Accordingly, all such modifications and variations are intended to be included within the scope of the appended claims. The specification and examples are only exemplary. The following claims define the true scope and spirit of the invention.

We claim:

1. A method of providing an encoded video stream to a client over a network, the method comprising:

storing a forward-encoded bit-stream and a reverse-encoded bit-stream for video data, the forward-encoded bit-stream including first frames encoded without inter-frame dependencies and second frames encoded depending on forward-direct preceding frames, and the reverse-encoded bit-stream including third frames encoded without inter-frame dependencies and fourth frames encoded depending on reverse-direction preceding frames;

receiving a request with a video cassette recording (VCR) function from the client;

examining costs of decoding a requested frame in a forward direction from one of the first and third frames, in a reverse direction from another one of the first and third frames, and in either the forward or reverse direction from a current frame;

selecting a frame with a least cost among said one of the first and third frames, said another one of the first and third frames, and said current frame;

switching the forward-encoded and reverse-encoded bit streams, if the frame with the least cost belongs to a different bit-stream than the requested frame;

selecting one or more succeeding frames until reaching the requested frame among the second or the fourth frames;

reading out selected frames among the first, second, third, and fourth frames in accordance with the request; and transmitting the selected frames to the client.

2. The method of claim 1, further comprising:

storing at least one drift-compensation bit-stream for the video data, the drift-compensation bit-stream including prediction of frames in the forward-encoded bit-stream from frames in the reverse-encoded bit-stream and prediction of frames in the reverse-encoded bit-stream from frames in the forward-encoded bit-stream; and substituting, after the switching, a frame of the drift-compensation bit-stream for one of the second or the fourth frames.

3. A method of providing an encoded video stream to a client over a network, the method comprising:

storing a forward-encoded bit-stream and a reverse-encoded bit-stream for video data, the forward-encoded bit-stream including first frames encoded without inter-frame dependencies and second frames encoded depending on forward-direct preceding frames, and the reverse-encoded bit-stream including third frames encoded without inter-frame dependencies and fourth frames encoded depending on reverse-direction preceding frames;

receiving a request with a video cassette recording (VCR) function from the client;

selecting a closest one of the first and third frames to a requested frame when the VCR function of the request is a fast-mode play;

switching the forward-encoded and reverse-encoded bit-streams, if the closest frame belongs to a different bit-stream than the requested frame;

selecting one or more succeeding frames until reaching the requested frame among the second or the fourth frames;

reading out selected frames among the first, second, third, and fourth frames in accordance with the request; and transmitting the selected frames to the client.

4. The method of claim 3, further comprising:

storing a first drift-compensation frame for predicting a reverse-direction succeeding frame from each of the first frames of the forward-encoded bit-stream, and a second drift-compensation frame for predicting a forward-direction succeeding frame from each of the third frames of the reverse-encoded bit-stream; and substituting, after the switching, the first drift-compensation frame for one of the fourth frames, or the second drift-compensation frame for one of the second frames.

* * * * *